US012552584B2

(12) United States Patent
Huang et al.

(10) Patent No.: US 12,552,584 B2

(45) Date of Patent: Feb. 17, 2026

(54) LOW PROFILE LATCH

(71) Applicant: STANLEY BLACK & DECKER MEA FZE, Dubai (AE)

(72) Inventors: Jin-Chi Huang, Taichung (TW); Hui-Ling Teng, Taichung (TW); Xiang-Kai Hsu, Taichung (TW); Fu-Yao Cheng, Taipei (TW); Shun-Chi Yang, Taichung (TW); Wan-Chiang Wang, Taichung (TW)

(73) Assignee: STANLEY BLACK & DECKER MEA FZE, Jebel Ali (AE)

( * ) Notice: Subject to any disclaimer, the term of this patent is extended or adjusted under 35 U.S.C. 154(b) by 166 days.

(21) Appl. No.: 18/345,573

(22) Filed: Jun. 30, 2023

(65) Prior Publication Data

US 2024/0002110 A1 Jan. 4, 2024

(30) Foreign Application Priority Data

Jul. 4, 2022 (EP) .................................... 22182750

(51) Int. Cl.

*B65D 43/22* (2006.01)
*B25H 3/02* (2006.01)
*B65D 43/16* (2006.01)

(52) U.S. Cl.

CPC ............... *B65D 43/22* (2013.01); *B25H 3/02* (2013.01); *B65D 43/16* (2013.01); *B65D 2251/1058* (2013.01)

(58) Field of Classification Search

CPC ... B25H 3/021; F16B 5/0635; Y01T 403/608; B65D 2251/1058; B65D 21/0028; B65D 21/0217; B65D 21/0224; B65D 21/0219

USPC ....... 206/509, 821, 499; 220/324, 380, 23.6, 220/781, 4.26, 675; 211/194, 49.1, 188

See application file for complete search history.

(56) References Cited

U.S. PATENT DOCUMENTS

| | | | | | |
|---|---|---|---|---|---|
| 2,807,387 | A * | 9/1957 | Siciliano | B65D 21/0213 | 220/4.27 |
| 3,134,617 | A * | 5/1964 | Slonnerger | E05C 19/14 | 292/113 |
| 3,174,784 | A * | 3/1965 | Swanson | E05C 19/14 | 292/113 |
| 3,635,361 | A * | 1/1972 | Hayes | B65D 21/0224 | 206/510 |

(Continued)

OTHER PUBLICATIONS

Extended European Search Report, EP Application No. 22182750.4, Dec. 15, 2022, 8 pages, EPO.

*Primary Examiner* — Steven A. Reynolds
*Assistant Examiner* — Prince Pal
(74) *Attorney, Agent, or Firm* — Mintz, Levin, Cohn, Ferris, Glovsky and Popeo, P.C.

(57) ABSTRACT

This invention relates to a latch for selectively binding lower and upper portions of a container. The latch includes a base having a front face, a rear face, a connected end, and a selectively engageable binding end. The rear face further includes an upward hook, a downward hook, and a binding tooth. The latch is characterized in that the upward hook and the downward hook are configured to engage the lower portion of the container and permit both axial and pivotal movement of latch. The axial movement is between an upward position and a low profile position The pivotal movement is about the connected end such that binding end can move between a disengaged and an engaged position.

18 Claims, 7 Drawing Sheets

(56) References Cited

U.S. PATENT DOCUMENTS 3,659,743 A * 5/1972 Box .................. B65D 21/0201 206/506
4,540,206 A * 9/1985 Frame .................... E05C 19/14 292/DIG. 60
4,893,724 A * 1/1990 Schiemann .......... B65D 47/088 220/815
4,915,913 A * 4/1990 Williams ............... B65D 45/24 436/1
5,011,013 A * 4/1991 Meisner ................. B25H 3/023 292/205
5,042,674 A * 8/1991 Ramsay ............. B65D 21/0234 206/508
5,199,592 A * 4/1993 Reiland .............. B65D 11/1833 220/817
5,234,124 A * 8/1993 Buckner, III .......... A61B 1/121 220/326
5,281,045 A * 1/1994 Ichikawa ................ F16B 7/105 403/325
5,553,712 A * 9/1996 Tisbo ...................... B42F 17/18 206/455
5,699,925 A * 12/1997 Petruzzi ............. B65D 21/0204 206/508
5,730,311 A * 3/1998 Curtis ................ B65D 51/1611 206/508
5,860,527 A * 1/1999 Frankenberg ............ B65D 1/22 206/509
5,967,322 A * 10/1999 Apps .................. B65D 55/0854 222/105
6,134,832 A * 10/2000 Bokmiller .............. A01G 9/021 206/509
6,371,320 B2 * 4/2002 Sagol ..................... B25H 3/026 220/4.27
6,527,309 B1 * 3/2003 Gaydos ............... E05B 65/5276 292/DIG. 22
6,585,090 B2 * 7/2003 Harvey .................... A45C 5/04 206/509
6,874,634 B2 * 4/2005 Riley ..................... A61B 50/30 206/439
6,889,838 B2 * 5/2005 Meier .................... B25H 3/026 206/508
7,658,887 B2 * 2/2010 Hovatter ................. B01L 9/543 211/85.17
7,854,321 B2 * 12/2010 Twig ...................... B25H 3/023 206/483
D637,001 S * 5/2011 Vilkomirski ................... D7/318
8,210,387 B2 * 7/2012 Twig ...................... B25H 3/022 220/521
8,210,579 B2 * 7/2012 Vilkomirski .............. E05C 3/14 292/DIG. 31
8,240,504 B2 * 8/2012 Fallen ................ B65D 21/0219 206/508
8,297,464 B2 * 10/2012 Grenier .............. A45C 13/1084 220/314
D674,605 S * 1/2013 Vilkomirski ................... D3/905
8,505,729 B2 * 8/2013 Sosnovsky ............. B65D 45/22 220/756
8,567,796 B2 * 10/2013 Bar-Erez ................... B62B 1/04 280/47.26
8,590,724 B2 * 11/2013 Kreidler .................. E05B 63/24 292/246
D694,522 S * 12/2013 Horovitz ........................ D3/297
8,770,426 B2 * 7/2014 Arnett ................... E05B 15/022 220/834
8,813,960 B2 * 8/2014 Fjelland ............... B65D 21/023 220/4.27
8,851,287 B2 * 10/2014 Becklin .............. B65D 21/0224 108/55.3
8,875,888 B2 * 11/2014 Koenig .............. B65D 21/0223 206/508
8,910,788 B2 * 12/2014 Roach .................... A45C 11/00 16/366
8,944,476 B1 * 2/2015 Henderson .............. E05B 15/02 292/285
8,944,537 B1 * 2/2015 Manalang .............. B25H 3/028 312/319.2
9,193,060 B2 * 11/2015 Ben-Gigi ........... B65D 25/2867
D744,750 S * 12/2015 Sabbag .......................... D3/905
9,616,563 B2 * 4/2017 Vilkormirski .......... B25H 3/023
D798,053 S * 9/2017 Shitrit ............................ D3/276
9,796,076 B2 * 10/2017 Baruch .................. B25H 3/023
10,022,856 B2 * 7/2018 Bensman ............... B25H 3/028
RE47,022 E * 9/2018 Sosnovsky ............. B65D 45/22
10,160,471 B2 * 12/2018 Yahav ..................... B62B 5/065
D851,929 S * 6/2019 Shpitzer ......................... D3/276
D857,388 S * 8/2019 Shpitzer ......................... D3/905
10,575,417 B2 * 2/2020 Sabbag .............. B65D 21/0217
10,583,962 B2 * 3/2020 Brunner ................. B25H 3/021
10,625,910 B2 * 4/2020 Hu ......................... B65D 45/20
10,697,215 B2 * 6/2020 Li .......................... B65D 43/22
10,710,770 B2 * 7/2020 Kögel ................ B65D 21/0212
10,793,172 B2 * 10/2020 Brunner ............. B65D 21/0212
10,870,513 B2 * 12/2020 Gonitianer ......... B65D 21/0228
11,059,631 B1 * 7/2021 Brunner ............. B65D 21/0217
11,155,382 B1 * 10/2021 Cai .................... B65D 21/0223
11,185,974 B2 * 11/2021 Omry ........................ B25H 3/02
11,203,465 B2 * 12/2021 Seiders ............... E05B 65/5207
11,230,410 B2 * 1/2022 Brunner ................... B25H 3/02
11,486,427 B2 * 11/2022 Baruch ..................... B25H 3/02
11,549,284 B2 * 1/2023 Chou .................... G06F 1/1679
11,642,777 B2 * 5/2023 Baruch .................. B25H 3/022 403/322.4
11,738,914 B2 * 8/2023 Bullock .................. E05C 19/14 220/839
12,108,853 B2 * 10/2024 Nichols ................ A45C 13/005
2002/0000440 A1 * 1/2002 Sagol ....................... B25H 3/00 220/23.6
2002/0162841 A1 * 11/2002 Shamir ..................... A61L 2/26 220/326
2003/0038142 A1 * 2/2003 Gee ...................... B65D 43/166 220/4.24
2003/0111476 A1 * 6/2003 Serio, Jr. .............. A45C 13/008 220/745
2003/0147691 A1 * 8/2003 Ho ............................. B62J 9/23 403/322.1
2003/0234200 A1 * 12/2003 Diamant ............ B65D 21/0223 206/508
2004/0007546 A1 * 1/2004 Stinnett ..................... A47F 1/08 211/194
2005/0001435 A1 * 1/2005 Parker ....................... E05C 3/06 292/116
2005/0155889 A1 * 7/2005 Lown ..................... A01K 97/06 206/501
2006/0017293 A1 * 1/2006 Tonelli ................ E05B 65/5276 292/202
2006/0186003 A1 * 8/2006 Dost .................. A45C 13/1084 206/349
2007/0222231 A1 * 9/2007 Vilkomirski ............. B25H 3/02 292/226
2008/0116098 A1 * 5/2008 Marooflan ........... B65D 77/225 206/503
2008/0116696 A1 * 5/2008 Schmitt ................... E05C 19/14 16/221
2009/0120835 A1 * 5/2009 Ublacker ................. B65D 7/06 206/774
2009/0236255 A1 * 9/2009 Piacenza ................ B65D 45/22 206/508
2009/0263187 A1 * 10/2009 Lee ....................... B25C 5/1665 403/330
2010/0224528 A1 * 9/2010 Madsen ............. B65D 21/0217 206/505
2010/0320108 A1 * 12/2010 Riedel ................. E05B 65/5276 206/372
2011/0100856 A1 * 5/2011 Rosko ................ B65D 21/0202 206/503
2011/0139666 A1 * 6/2011 Sosnovsky ............. B25H 3/021 206/508
2011/0158761 A1 * 6/2011 Jackson ............... B65D 21/064 410/96

(56) References Cited

U.S. PATENT DOCUMENTS

| | | | | |
|---|---|---|---|---|
| 2011/0181008 | A1* | 7/2011 | Bensman | B25H 3/02 220/660 |
| 2012/0024739 | A1* | 2/2012 | Fjelland | F16B 45/036 403/321 |
| 2012/0080432 | A1* | 4/2012 | Bensman | B25H 3/023 220/752 |
| 2012/0132558 | A1* | 5/2012 | Busch | B65D 21/062 206/503 |
| 2012/0168444 | A1* | 7/2012 | Shitrit | B25H 3/02 220/324 |
| 2012/0222983 | A1* | 9/2012 | Sabounjian | B65D 21/062 206/503 |
| 2012/0267369 | A1* | 10/2012 | Duvigneau | B65D 43/0204 220/795 |
| 2012/0317933 | A1* | 12/2012 | Crull | E05B 65/5276 220/324 |
| 2014/0070677 | A1* | 3/2014 | Baruch | E05B 65/467 312/216 |
| 2014/0251998 | A1* | 9/2014 | Kinskey | B65D 45/18 292/95 |
| 2014/0319147 | A1* | 10/2014 | Horovitz | B65D 43/163 220/845 |
| 2015/0001120 | A1* | 1/2015 | Gaskell | B65D 21/0204 206/504 |
| 2015/0151427 | A1* | 6/2015 | Ben-Gigi | B65D 21/0228 220/4.27 |
| 2015/0190919 | A1* | 7/2015 | Chang | A44B 11/28 206/349 |
| 2015/0352711 | A1* | 12/2015 | Brunner | B25H 3/02 206/349 |
| 2016/0008973 | A1* | 1/2016 | Bensman | B65D 43/16 206/372 |
| 2016/0075479 | A1* | 3/2016 | Finke | B65D 21/045 206/459.5 |
| 2017/0066124 | A1* | 3/2017 | Baruch | B65D 43/16 |
| 2017/0121056 | A1* | 5/2017 | Wang | B65D 21/0228 |
| 2017/0129645 | A1* | 5/2017 | Chang | B65D 21/0209 |
| 2017/0158216 | A1* | 6/2017 | Yahav | B62B 5/0013 |
| 2019/0048631 | A1* | 2/2019 | Li | E05C 19/14 |
| 2019/0168376 | A1* | 6/2019 | Brocket | B25H 3/021 |
| 2019/0217999 | A1* | 7/2019 | Wood | B65D 81/3813 |
| 2019/0291928 | A1* | 9/2019 | van Driel | B65D 43/0202 |
| 2020/0025229 | A1* | 1/2020 | Baruch | B25H 3/02 |
| 2020/0055631 | A1* | 2/2020 | Combs | B65D 21/0215 |
| 2020/0298392 | A1* | 9/2020 | Baruch | B25H 3/02 |
| 2020/0307879 | A1* | 10/2020 | Karlsson | B65D 55/02 |
| 2021/0155373 | A1* | 5/2021 | Cai | B65D 21/0212 |
| 2021/0188521 | A1* | 6/2021 | Stephens | B65D 81/3834 |
| 2021/0221561 | A1* | 7/2021 | Davidian | B65D 21/0224 |
| 2021/0229863 | A1* | 7/2021 | Sostmann | B65D 81/261 |
| 2021/0291954 | A1* | 9/2021 | Antoine | B64C 1/14 |
| 2021/0387325 | A1* | 12/2021 | Heath | B25H 3/023 |
| 2022/0226981 | A1* | 7/2022 | Adams | B25H 3/02 |
| 2022/0396985 | A1* | 12/2022 | Li | E05C 19/063 |
| 2023/0041979 | A1* | 2/2023 | Yang | B65D 43/24 |
| 2023/0150732 | A1* | 5/2023 | Bullock | E05B 65/5276 220/839 |
| 2023/0313580 | A1* | 10/2023 | Wendt | E05D 7/1077 220/324 |
| 2024/0002110 | A1* | 1/2024 | Huang | B25H 3/02 |

* cited by examiner

LOW PROFILE LATCH

CROSS-REFERENCE TO RELATED APPLICATIONS

This application claims priority to EP Patent Application No. 22182750.4, filed on Jul. 4, 2022, which is incorporated herein by reference in its entirety.

FIELD OF THE INVENTION

The present invention relates to a latch. More specifically, a low profile latch for a container.

BACKGROUND OF THE INVENTION

Latches are well known mechanisms for selectively securing the upper and lower portions of containers, like accessory toolboxes. There are two types of latches: one-piece and two-piece. One-piece latches are typically fixed to the lower portion of the container. When an operator wishes to close or secure the upper portion of the container, she applies pressure to an upper portion of the latch causing the same to engage and secure the upper portion. This one-piece mechanism has the advantage in that it is relatively inexpensive to manufacture. However, one-piece latches have a drawback in that they have a high profile. When the container is in its open position, such as that shown in FIG. 2 herein, the upper portion of the latch is well above the surface of container. For ease of access, is not uncommon for operators to store accessory toolboxes on a shelf or cubby while they are in their open position. Such shelves or cubbies are often sized only to receive the open container. The high profile one-piece latch will hit the shelf or cubby above and prevent the container from being completely stored on the desired shelf.

Two-piece latches solve the problem in that they typically have a movable ring with an upper engagement portion. The ring is attached to the lower portion of the container. When an operator desires to secure the container, she swings the ring and upper engagement portion up so that it can engage and secure the upper portion of the container. The movable nature of the ring and upper engagement portion allows the latch to present a low profile when the container is open. However, the two piece nature this type is often more expensive to manufacture. It would be advantageous to have an inexpensive one-piece type latch that can present a low profile when it is not securing the upper and lower portions of a container and said container is in its open position.

SUMMARY OF THE INVENTION

According to a first aspect of the invention, a latch for selectively binding lower and upper portions of a container. The latch includes a base having a front face, a rear face, a connected end, and a selectively engageable binding end. The rear face further includes an upward hook, a downward hook, and a binding tooth. The latch is characterized in that the upward hook and the downward hook are configured to engage the lower portion of the container and permit both axial and pivotal movement of latch. The axial movement is between an upward position and a low profile position. In the upward position, the binding end is high enough that the binding tooth can engage and bind the upper portion of the container. In the low profile position, the binding end is too low to engage and bind the upper portion of the container. The pivotal movement is about the connected end such that binding end can move between a disengaged and an engaged position. In the disengaged position, the binding end is distal from the upper portion of the container such that the two portions cannot be bound together. In the engaged position, the binding end is adjacent the upper portion of the container such that the binding tooth can engage the upper portion of the container and bind the two portions can together.

According to another aspect of the invention, a container having an upper and lower portion connected to one another by a hinge, such that when the upper and lower portions come into contact with one another, they define an interior space. The container further includes a latch for selectively binding lower and upper portions of the container. The latch includes a base having a front face, a rear face, a connected end, and a selectively engageable binding end. The rear face further includes an upward hook, a downward hook, and a binding tooth. The latch is characterized in that the upward hook and the downward hook are configured to engage the lower portion of the container and permit both axial and pivotal movement of latch. The axial movement is between an upward position and a low profile position. In the upward position, the binding end is high enough that the binding tooth can engage and bind the upper portion of the container. In the low profile position, the binding end is too low to engage and bind the upper portion of the container. The pivotal movement is about the connected end such that binding end can move between a disengaged and an engaged position. In the disengaged position, the binding end is distal from the upper portion of the container such that the two portions cannot be bound together. In the engaged position, the binding end is adjacent the upper portion of the container such that the binding tooth can engage the upper portion of the container and bind the two portions can together.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physical or electrical, whether direct or indirect, affixed or adjustably mounted. Thus, unless specified, "connected" or "attached" is intended to embrace any operationally functional connection. When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

In the following description, reference is made to the accompanying attachments and drawings which are provided for descriptive and illustration purposes as representative of specific exemplary embodiments in which the invention may be practiced. Given the following description of the specification and drawings, the apparatus, methods, and systems should become evident to a person of ordinary skill in the art. Further areas of applicability of the present teachings will become apparent from the description and illustrations provided herein. It is to be understood that other embodiments can be utilized and that structural changes based on presently known structural and/or functional equivalents can be made without departing from the scope of the invention.

BRIEF DESCRIPTION OF THE DRAWINGS

The above-mentioned and other features, embodiments, and advantages of this invention, and the manner of attaining them, will become more apparent and the invention will be better understood by reference to the following descriptions of embodiments of the invention taken in conjunction with the accompanying drawings, wherein.

Corresponding illustrated images and attachments indicate corresponding parts throughout the several views of the present invention. The exemplifications set out herein illustrate embodiments of the present invention, and such exemplifications are not to be construed as limiting the scope of the present invention in any manner.

These and other features of the invention will become apparent upon review of the following description of the presently preferred embodiments of the invention, taken into conjunction with the figures.

DETAILED DESCRIPTION OF THE ILLUSTRATED EMBODIMENT(S)

A detailed description of apparatuses, methods, and systems, consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 5B:
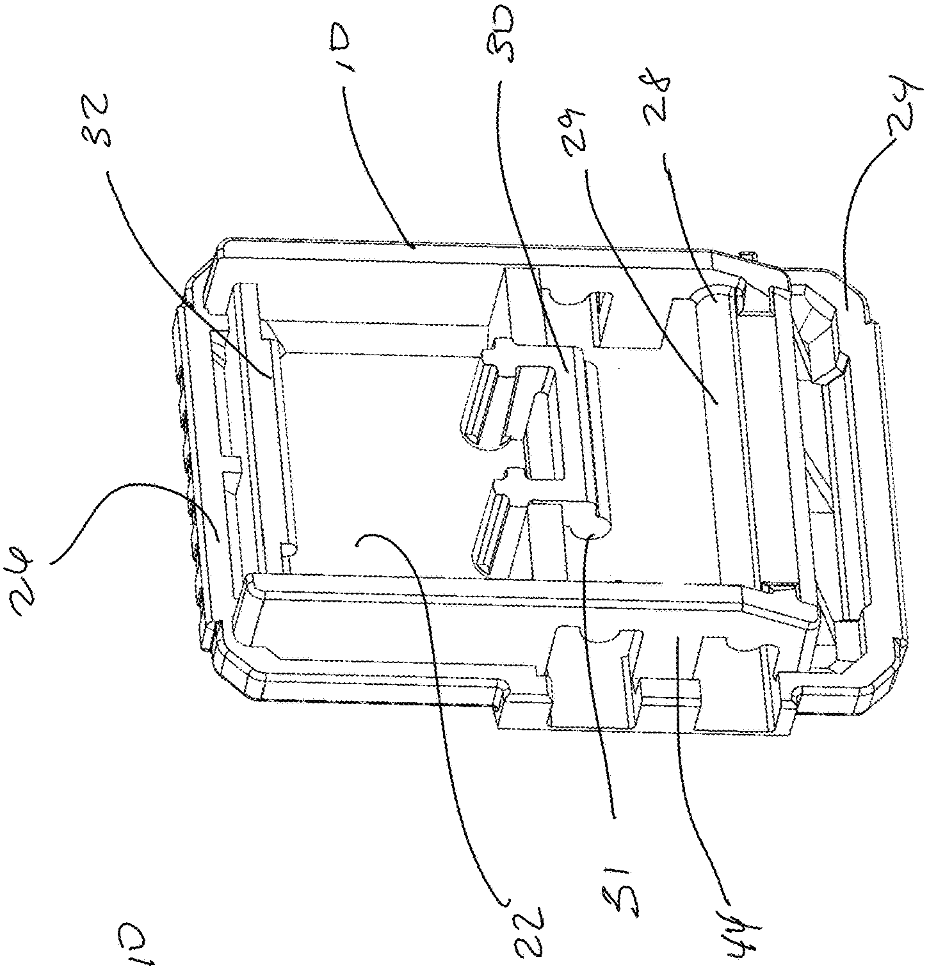
FIGS. 5*a* and 5*b* respectively are front and rear perspective views of a latch according to the present invention.
Figure 5A:
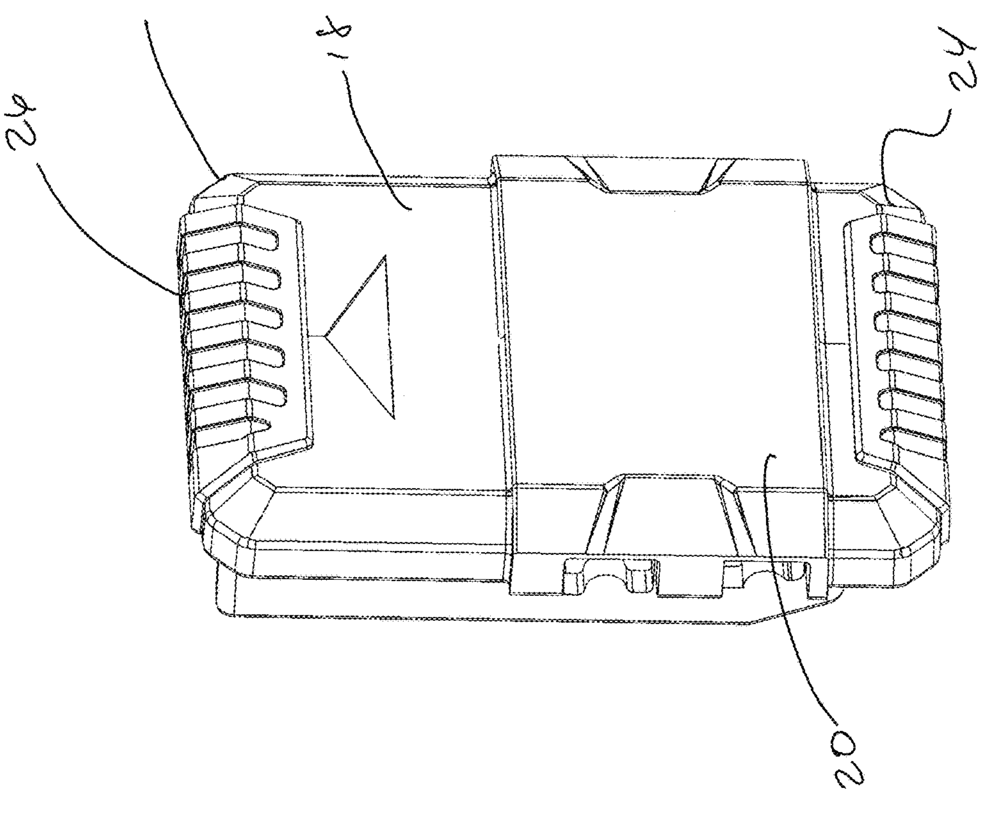

FIGS. 1, 2, 3 and 4 depict various views of a container 16 and latch 10 according to the present invention. The latch 10 is configured to selectively bind the lower portion 12 and upper portion 14 of the container 16. The latch includes a base 18 having a front face 20, a rear face, 22, a connected end 24, and a selectively engageable binding end 26. As best seen in FIG. 5*b*, in a preferable embodiment, the rear face 22 further includes a upward hook 28 that is adjacent the connected end 24, a downward hook 30 that is centrally positioned on the rear face 22, and a binding tooth 32 that is adjacent the binding end 26. The upward hook 28 and downward hook 30 are configured to engage the lower portion 12 of the container 16 and permit both axial and pivotal movement of the latch 10. Those skilled in the art will recognize that the upward hook 28, downward hook 30 and binding tooth 32 may also be positioned in other places on the rear face 22 without departing from the scope of the invention.

The axial movement of the latch 10 is between an upward potion and a low profile position. In the upward position, the binding end 26 is high enough that the binding tooth can engage and bind the upper portion 14 of the container 16. In the low profile position, the binding end 26 is too low to engage and bind the upper portion 14 of the container 16.

The pivotal movement of the latch 10 is about the connected end 24 such that the binding end 26 can move between a disengaged and engaged position. In the disengaged position, the binding end is distal from the upper portion 14 of the container 16 such that the lower and upper portions 12, 14 cannot be bound together. In the engaged position, the binding end 26 is adjacent the upper portion 14 of the container such that the binding took 32 can engage the upper portion 14 of the container 16 and bind the lower and upper portions 12, 14 together.

Figure 6B:
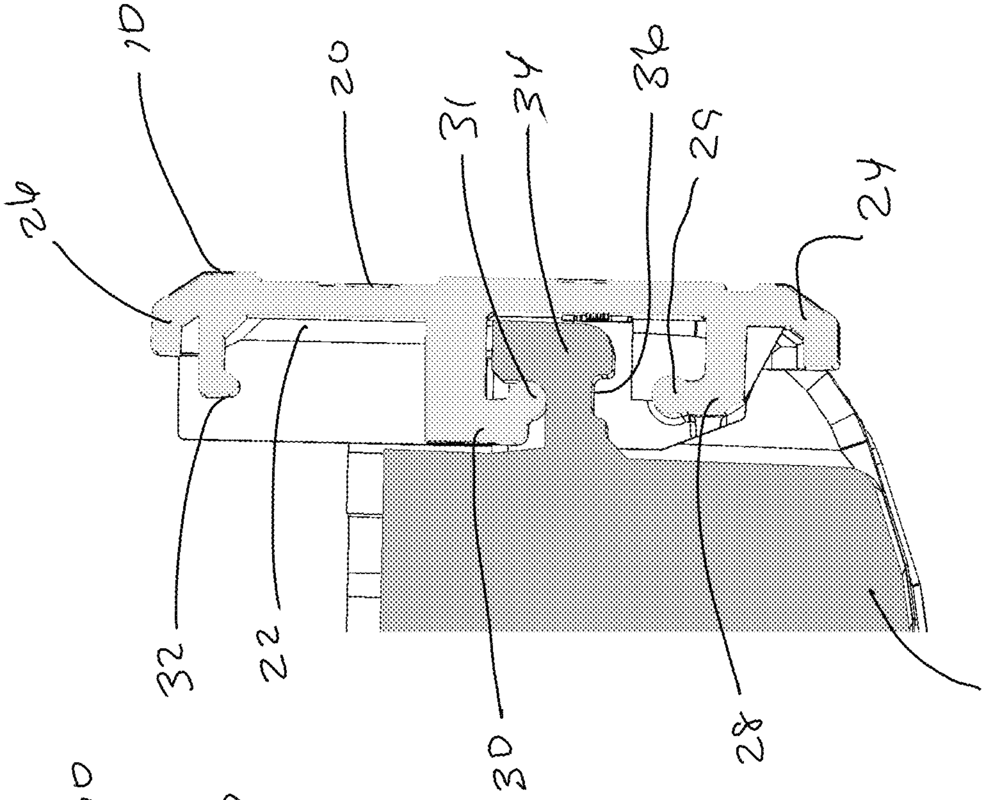
FIGS. 6*a* and 6*b* respectively are cutaway views of a latch in its upward and low profile positions.
Figure 6A:
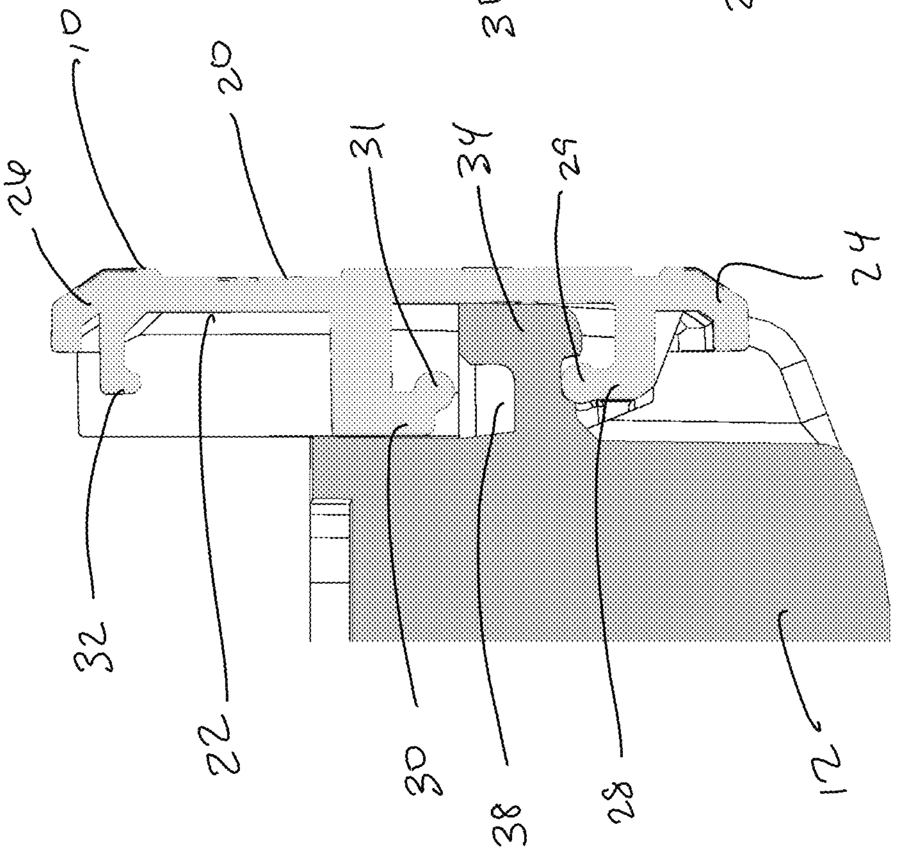
Figure 7B:
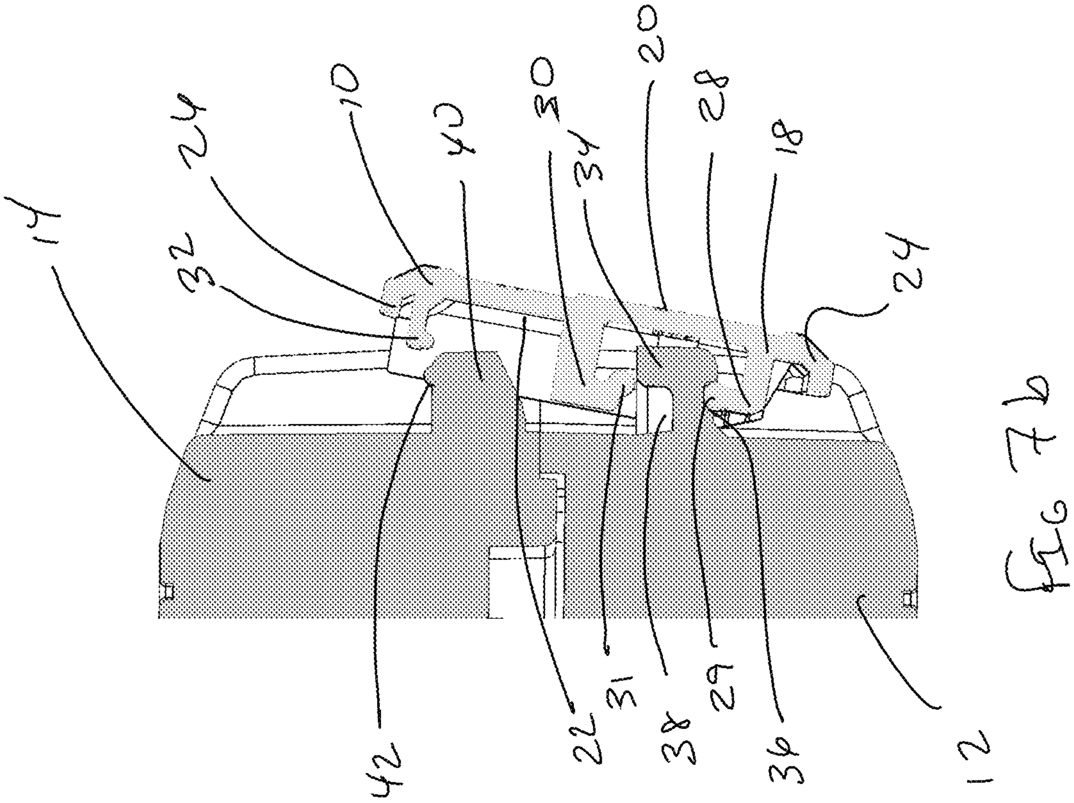
FIGS. 7*a* and 7*b* respectively are cutaway views of a latch in its engaged and disengaged positions.
Figure 7A:
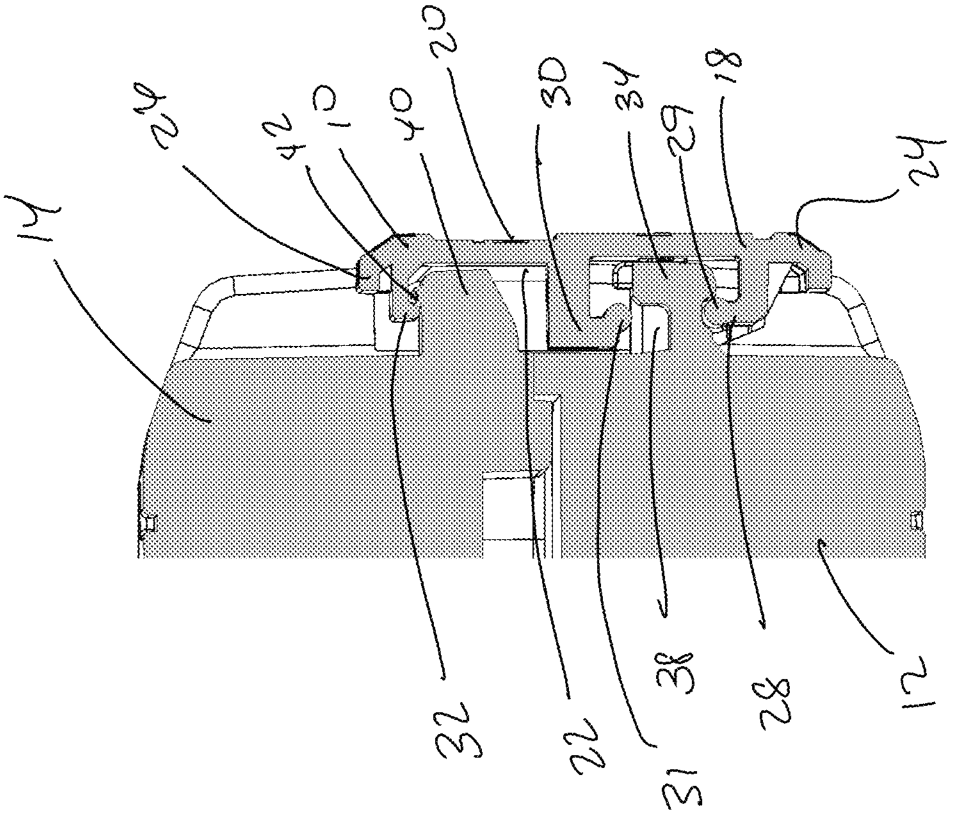

As best seen in FIGS. 6*a* and 6*b*, which shows cutaway views of the latch 10, the axial movement is facilitated by the upward hook 28 and downward hook's 30 engagement to a protrusion 34 on the lower portion 12 of the container 16. Likewise, as shown in FIGS. 7*a* and 7*b*, the pivotal movement of the latch 10 is also facilitated by the upward hook 28 and downward hook's to the protrusion 34. In a preferable embodiment, the upper hook 28 is shaped to engage an lower cavity 36 that is defined by the protrusion 34. For example, the upper hook 28 may include a rounded bulb 29 that is configured to engage lower cavity 36. Similarly, the downward hook 30 may also be shaped to engage an upper cavity 38 defined by the protrusion 34. For example, the downward hook may include a rounded bulb 31 that is configured to engage the upper cavity 38.

In a preferable embodiment, the binding of the lower and upper portions 12, 14 is achieved by the binding tooth 32 engaging a protrusion 40 on the upper portion 14 of the container 16. Preferably, the binding tooth engages a clasping tooth 42 that is positioned on protrusion 40. Those skilled in the art will recognize that the clasping tooth 42 could also be replaced with a clasping depression (not shown) that is configured to receive the binding tooth.

In yet another preferable embodiment, as shown in FIG. 5*b*, the latch 10 may also include vertical guides 44. Said vertical guides 44 may be positioned on the rear face 22 outside the upward hook 28 and downward hook 30. The vertical guides 44 are configured to guide the axial movement of the latch between its upward and low profile positions.

Figure 2:
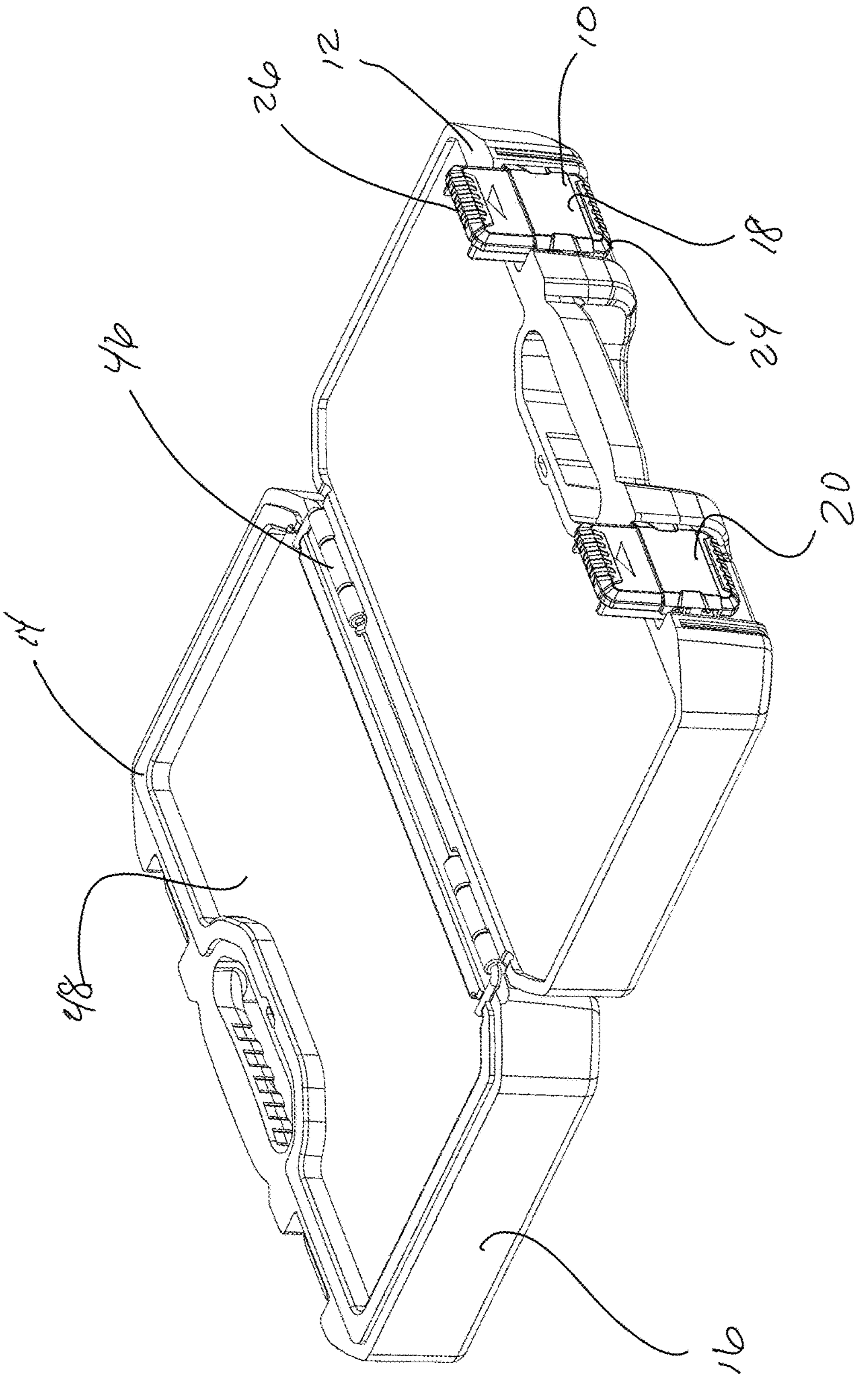
FIG. 2 is a perspective view of an open container containing latches according to the present invention.

In addition to a standalone latch, the present invention also contemplates a container with said latch. As best seen in FIG. 2, the container 16 includes a lower portion 12 and an upper portion 14 connected to one another by a hinge 46. The lower portion 122 and upper portions 14 are free to move about the hinge 46 such that when the two portions come into contact with one another, they define an interior space 48. The latch 10 of container 16 is configured to selectively bind the lower 12 and upper 14 portions and limit access to the interior space 48. Those skilled in the art will recognize that the latch 10 of container 16 includes all of the elements and functionality of the stand alone latch as described above. Therefore, it is not necessary to repeat all said elements and functionality here.

INDUSTRIAL APPLICABILITY

Figure 3:
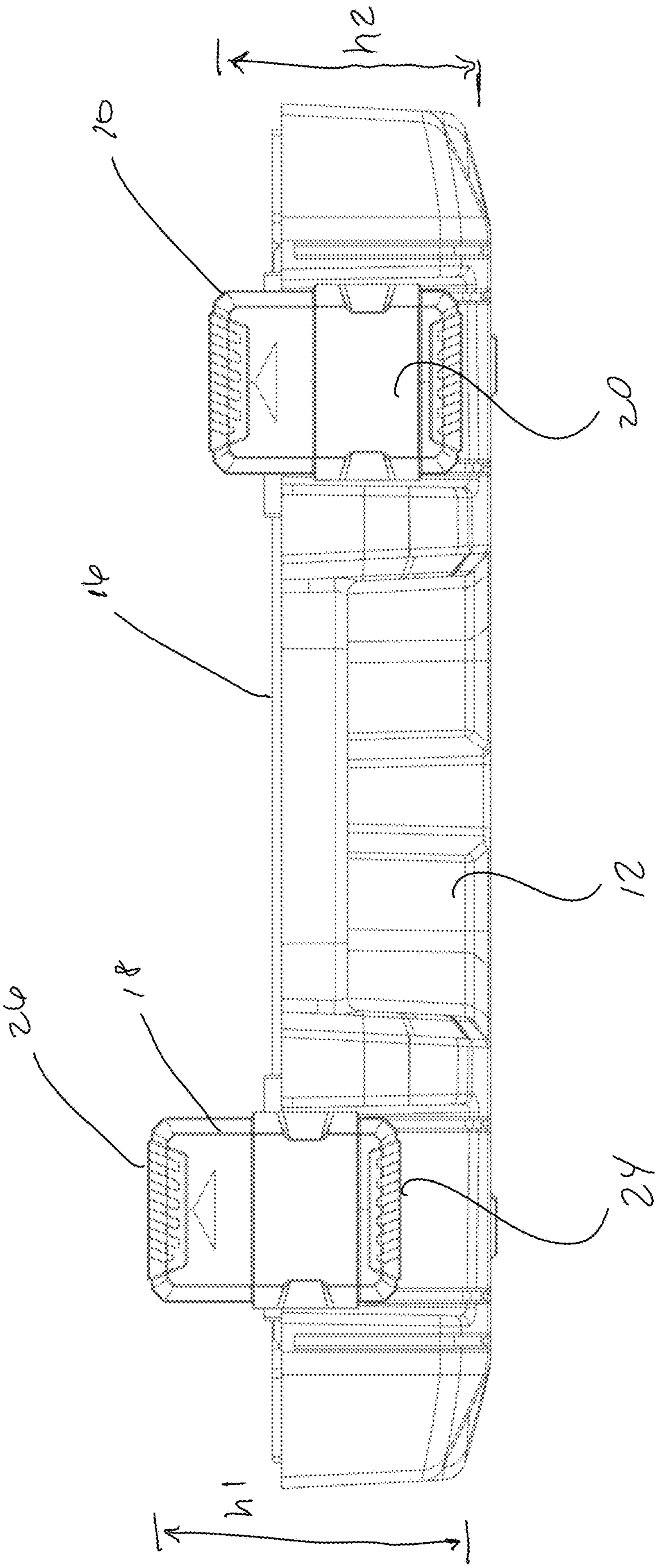
FIG. 3 is a frontal view of the container and latches of FIG. 2.
Figure 4:
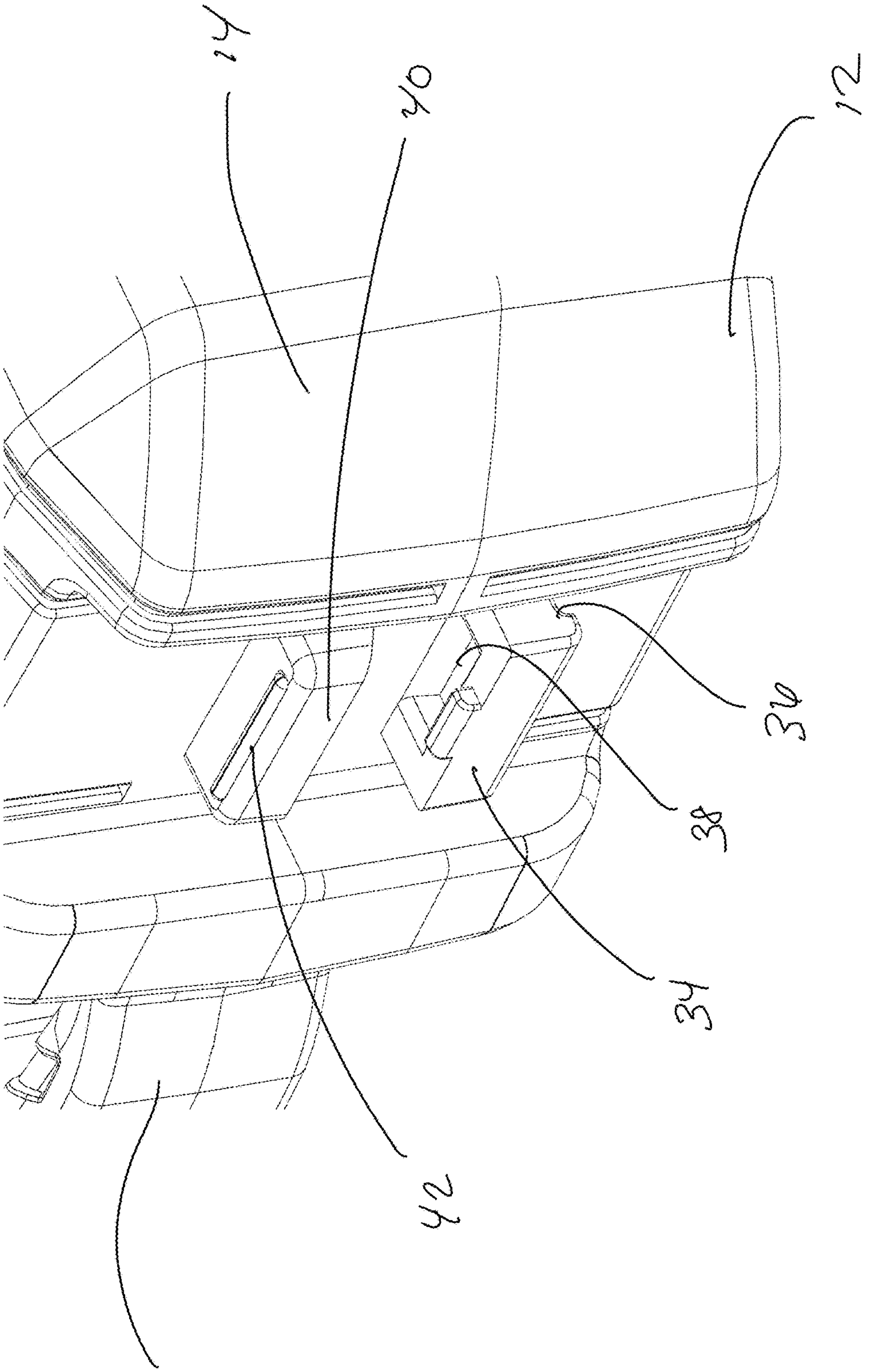
FIG. 4 is a detailed perspective view of the container showing where a latch is connected thereto.

We will now describe the industrial applicability of the latch and container. While on a jobsite, an operator will often need to have ongoing access to the interior space of toolbox. For example, she may be working with a variety of sockets, drill bits or accessories that are stored in an accessory toolbox. Because the job may require a variety of different tools, she may need to consistently come back to her accessory toolbox to swap out the correctly sized accessory. When working in this manner, the accessory toolbox or container 16 is maintained in its open configuration. See FIG. 2. However, space on a jobsite is sometimes limited. In these situations, it may be necessary for an operator to store the container 16 on a shelf or in a cubby that is out of the way. Such shelves may be height limited to allow for multiple shelves in a single confined space. To store an open accessory toolbox on a shelf such as this, it is necessary that the latch on said toolbox does not interfere with the shelves. If the latch does interfere with the shelves, it prevents the container from being fully inserted into the shelf. For example, as shown in FIG. 3, the height of the shelf may be less than h1 but greater than h2. When this happens, prior art latches that have a fixed height h1 interfere with the shelf when the container is inserted therein. To avoid this issue, the present invention discloses a container having latches that can move between an upward position (the latch on the left in FIG. 3) and the low profile position (the latch on the right in FIG. 3). In the upward position, the latch 10 may be at a height h1. In the low profile position, the latch 10 can move down to a lower height h2. When the latch is in its low profile position h2, the container can be easily stored on a shelf without the latch interfering with the same.

Figure 1:
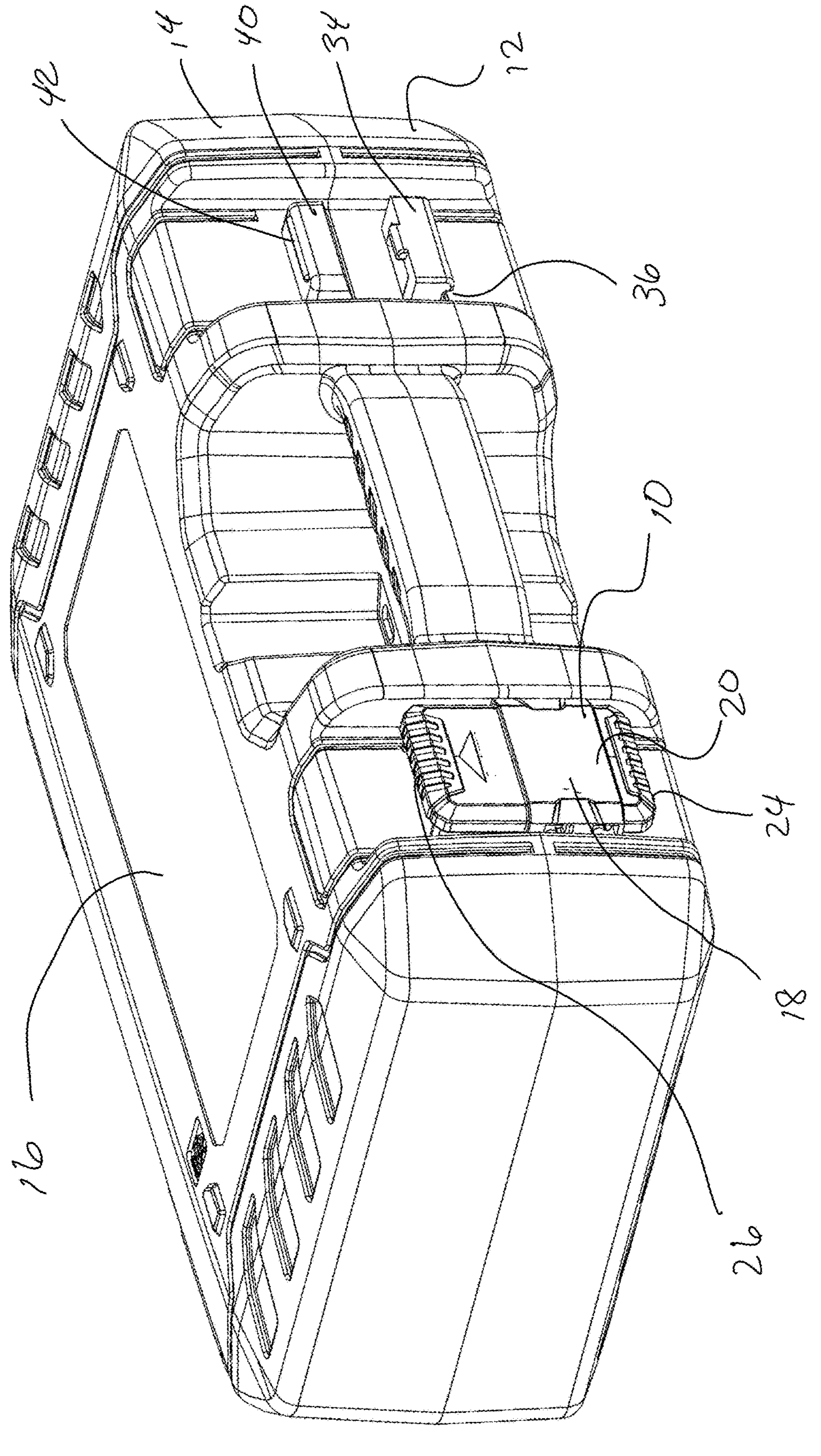
FIG. 1 is a perspective view of a closed container containing a latch according to the present invention.

We will now describe the operation of the latch 10. A container 16 such as that depicted in FIG. 1 is a common toolbox configured to permit the easy transport of sockets, drill bits, tools and/or other accessories. Those skilled in the art will recognize that the latch on the right has been removed to show additional details about how the latch 10 engages the container 16 and moves between its various positions e.g., upward position, low profile position, disengaged position and engaged position. As depicted in FIG. 1, the latch 10 on the left is in its upward and engaged positions wherein it is binds the upper portion 14 of the container 16, to the lower portion 12.

When an operator desires to open the latch 10, she pulls the binding end 26 of the latch 10 away from the container. More specifically, she pulls the binding end 26 away from the upper portion 14 of the container 16. As best seen in FIGS. 7*a* and 7*b*, when the operator pulls the binding end 26 away from the upper portion 14, the binding tooth 32 flexes a bit to overcome the clasping tooth 42 that is positioned on the protrusion 40. Once the binding tooth 32 overcomes the clasping tooth 42, the latch is no longer in its engaged position. Instead, the latch 10 is now in its disengaged position. In this position, the upper portion 14 of the container is now free to be moved away from lower portion 12 and the interior space 48 is accessible.

Critically, when the latch 10 is in its disengaged position, the connected end 24 remains engaged to the lower portion 12 of the container. This engagement is achieved via the upward hook 28, the downward hook 30 and protrusion 34. As the latch is pivoted from the engaged position to the disengaged position, the upward hook 28 engages the bottom of the protrusion 34, and the downward hook 30 engages the top of the protrusion 34. The spacing between upward hook 28 and the downward hook 30 is such that when the latch 10 is in its disengaged position, said hooks 28, 30 simultaneously engage the protrusion 34 and secure the connected end thereto. In a preferred embodiment, the upward hook 28 may further include a rounded bulb 29 that is configured to engage a lower cavity 36 that is defined by the protrusion 34. The engagement of the rounded bulb 29 into the lower cavity 36 helps further secure the latch to the protrusion. Those skilled in the art will recognize that the rounded bulb 29 positioned in the lower cavity 36 also helps facilitate the pivoting movement of the latch 10.

Once the latch 10 has been moved from its engaged position to its disengaged position, and the container 16 has been opened, the latch may be pivoted back toward the container such that the latch is in an upright or vertical position such as that shown in FIGS. 3 and 6*a*. The latch on the left in FIG. 3 is in its disengaged and upward position. In this position, the height of the latch as measured from the bottom of the lower portion 12 to the top or binding end 26 of the latch may be h1. As stated above, this height may be too high to allow the entire container and latch to be stored on a shelf or in a cubby. When this occurs, as shown on the right hand side of FIG. 3, an operator of the present invention may lower the latch 10 such that its height is h2 (also measured from the bottom of the lower portion 12 to the top or binding end 26 of the latch). FIGS. 6*a* and 6*b* show the detailed movement of the latch 10 from its upward position (FIG. 6*a*) to its low profile position (FIG. 6*b*). In FIG. 6*a*, the upward hook 28 is engaged to the bottom of protrusion 34. This engagement prevents further upward axial movement of the latch. To move the latch 10 into its low profile position, the latch is pressed downward such that the downward hook 30 engages the protrusion 34. In a preferred embodiment, the latch 10 may move from its upward position to its low profile position under the force of gravity. The one or more vertical guides 44 may guide such movement. In yet another preferred embodiment, the downward hook 30 may further include a rounded bulb 31 that is configured to engage an upper cavity 38 defined in the protrusion 34. This engagement allows the height h2 of the low profile position to be even lower. Those skilled in the art will recognize that the space between the upward and downward hooks 28, 30 is such that no matter where the latch 10 is in its axial spectrum (i.e., from the upward position h1 to its low profile position h2), the hooks make it difficult to remove the latch from the protrusion 34.

When the operator is finished with her work and desires to close and secure her toolbox, she simply does all the aforementioned steps in reverse. First, she raises the latch from its low profile position to its upward position. Then she pivots the binding end 26 of the latch 10 away from the container 16 to permit the upper portion 14 of the container to move about hinge 46 to its closed position. Next she pivots the binding end 26 of the latch back toward the upper portion 14. Pressure can then be applied to the binding end 26 such that the binding tooth 32 flexes, overcomes and becomes engaged to the clasping took 42 of protrusion 40.

The example and alternative embodiments described above may be combined in a variety of ways with each other. It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. Furthermore, the steps and number of the various steps illustrated in the figures may be adjusted from that shown. The accompanying figures and attachments illustrate exemplary embodiments of the invention.

Although the present invention has been described in terms of particular example and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the example and alternative embodiments described above can be configured without departing from the scope and spirit of the invention. Therefore, it is to be understood that, within the scope of the appended claims, the invention may be practiced other than as specifically described herein.

What is claimed is:

1. A latch for selectively binding lower and upper portions of a container, said latch comprising:

a base having a front face, a rear face, a connected end, and a selectively engageable binding end, and wherein the rear face further includes an upward hook, a downward hook, and a binding tooth, and wherein the upward hook and the downward hook are configured to selectively engage a lower portion of a container to permit both axial and pivotal movement of latch, and wherein said axial movement is between an extended position and a retracted position, wherein in said extended position, the upward hook is engaged with the lower portion and the downward hook is disengaged with the lower portion such that the binding tooth is spaced a first distance from the lower portion of the container, and wherein in said retracted position, the downward hook is engaged with the lower portion and the upward hook is disengaged with the lower portion such that the binding tooth is spaced a second distance less than the first distance from the lower portion of the container; and wherein said pivotal movement is about the connected end such that binding end can move between a disengaged position wherein the binding tooth is disengaged from an upper portion of the container, and an engaged position wherein the binding tooth is engaged with the upper portion of the container.

2. The latch of claim 1, wherein the axial and pivotal movement is facilitated by the upward hook and downward hook's engagement to a protrusion on the lower portion of the container.

3. The latch of claim 1, wherein the upward hook is shaped to engage a lower cavity defined by the protrusion on the lower portion of the container.

4. The latch of claim 1, wherein the downward hook is shaped to engage an upper cavity defined by a protrusion on the lower portion of the container.

5. The latch of claim 1, wherein the binding together of the upper and lower portions of the container is achieved by the binding tooth engaging a protrusion on the upper portion of the container.

6. The latch of claim 5, wherein the binding tooth is shaped to engage a clasping tooth positioned on the protrusion on the upper portion of the container.

7. The latch of claim 1, wherein the rear face further includes one or more vertical guides that run from the connected end to the binding end are positioned outside of the upward hook, downward hook and binding tooth.

8. A container with a latch comprising:

a lower portion and an upper portion connected to one another by a hinge such that when the lower and upper portions come into contact with one another, they define an interior space;

a latch configured to selectively bind the lower and upper portions together and limit access to the interior space, said latch comprising:

a base having a front face, a rear face, a connected end, and a selectively engageable binding end, and wherein the rear face further includes an upward hook, a downward hook, and a binding tooth, and wherein a height of the latch relative to the lower portion can be slidably adjusted between an extended position and a retracted position, wherein in said extended position, the upward hook is engaged with the lower portion and the downward hook is disengaged with the lower portion, and wherein in said retracted position, the downward hook is engaged with the lower portion and the upward hook is disengaged with the lower portion; and wherein the latch is pivotably movable about the connected end when the latch is in the extended position such that the binding end can move between a disengaged position and an engaged position, wherein in said disengaged position, the binding tooth is disengaged from the upper portion of the container, and in said engaged position, the binding tooth is engaged with the upper portion of the container.

9. The container with a latch of claim 8, wherein the axial and pivotal movement of the latch is facilitated by the upward hook and downward hook's engagement to a protrusion on the lower portion of the container.

10. The container with a latch of claim 8, wherein the upward hook is shaped to engage a lower cavity defined by the protrusion on the lower portion of the container.

11. The container with a latch of claim 8, wherein the downward hook is shaped to engage an upper cavity defined by the protrusion on the lower portion of the container.

12. The container with a latch of claims 8, wherein the binding together of the upper and lower portions of the container is achieved by the binding tooth engaging a protrusion on the upper portion of the container.

13. The container with a latch of claim 12, wherein the binding tooth is shaped to engage a clasping tooth positioned on the protrusion on the upper portion of the container.

14. The container with a latch of claim 8, wherein the rear face further includes one or more vertical guides that run from the connected end to the binding end are positioned outside of the upward hook, downward hook and binding tooth.

15. A container comprising:

a lower portion and an upper portion connected to one another by a hinge and movable about the hinge between an open position and a closed position; and a latch coupled to the lower portion, wherein the latch is configured to slide axially, relative to the lower portion, between an extended position in which the latch extends a first height above the lower portion of the container, and a retracted position in which the latch extends a second height less than the first height above the lower portion of the container, and wherein the latch is configured to pivot between an engaged position in which the latch is engaged with the upper portion of the container and a disengaged position in which the latch is entirely disengaged from the upper portion of the container.

16. The container of claim 15, wherein the latch comprises an upward-facing hook and a downward-facing hook configured to selectively engage the lower portion of the container, and wherein the upward-facing hook is engaged with the lower portion and the downward hook is disengaged with the lower portion when the latch is in the extended position, and wherein the downward-facing hook is engaged with the lower portion and the upward hook is disengaged with the lower portion when the latch is in the retracted position.

17. The container of claim 16, wherein the latch further comprises a binding tooth configured to bind the lower portion to the upper portion when the container is in the closed position and the latch is in the extended position and engaged position.

18. The container of claim 17, wherein the latch is coupled to the lower portion of the container at a connected end and is configured to pivot about the connected end when the latch is in the extended position between the engaged position in which the binding tooth is engaged with the upper portion when the container is in the closed position and the disengaged position in which the binding tooth is disengaged from the upper portion.

* * * * *